(12) United States Patent
Chacon et al.

(10) Patent No.: US 12,264,536 B2
(45) Date of Patent: Apr. 1, 2025

(54) MOTORIZED SHADE WITH AUTOMATED CONFIGURATION AND CONTROL

(71) Applicant: Wideband Labs, LLC, Joplin, MO (US)

(72) Inventors: Ryan Edward Chacon, Carthage, MO (US); Jason Turner, Joplin, MO (US); Joshua Amos Carrier, Carl Junction, MO (US)

(73) Assignee: Wideband Labs, LLC, Joplin, MO (US)

( * ) Notice: Subject to any disclaimer, the term of this patent is extended or adjusted under 35 U.S.C. 154(b) by 680 days.

(21) Appl. No.: 16/022,235

(22) Filed: Jun. 28, 2018

(65) Prior Publication Data

US 2019/0032404 A1 Jan. 31, 2019

Related U.S. Application Data

(60) Provisional application No. 62/537,336, filed on Jul. 26, 2017.

(51) Int. Cl.
*E06B 9/68* (2006.01)
*E06B 9/42* (2006.01)
(Continued)

(52) U.S. Cl.
CPC .................. *E06B 9/42* (2013.01); *E06B 9/72* (2013.01); *H01M 10/44* (2013.01); *H01M 10/46* (2013.01);
(Continued)

(58) Field of Classification Search
CPC ...... E06B 9/42; E06B 9/72; E06B 2009/6809; E06B 2009/6818; E06B 2009/6845;
(Continued)

(56) References Cited

U.S. PATENT DOCUMENTS 5,170,108 A 12/1992 Peterson et al.
5,274,499 A 12/1993 Shopp
(Continued)

FOREIGN PATENT DOCUMENTS

EP 2639663 A2 9/2013
WO 2014165363 A1 10/2014
(Continued)

OTHER PUBLICATIONS

"Blinds and Shades," Somfy®, somfysystems.com, accessed: Jul. 2017. https://www.somfysystems.com/residential/Interior/blinds-shades.
(Continued)

*Primary Examiner* — Abe Massad
(74) *Attorney, Agent, or Firm* — AVEK IP, LLC; Mark C. Young

(57) ABSTRACT

A motorized roller shade configured to connect to a power over Ethernet network includes a motor for rotating the shade to roll and unroll shade material to and from a roller tube to raise and lower the shade. A rechargeable battery positioned in the roller tube provides power to the motor and to logic and control circuitry also positioned within the roller tube. The logic and control circuitry charges the battery though power derived from the power over Ethernet network, and controls the operation of the motor to achieve a desired target velocity. Synchronized operation of multiple motorized roller shades is achieved though autonomous operation of the shades by their corresponding logic and control circuitry. In exemplary embodiments, a lighting element controlled by the logic and control circuitry allows controlled lighting of the shade.

15 Claims, 11 Drawing Sheets

(51) Int. Cl.
*E06B 9/72* (2006.01)
*H01M 10/44* (2006.01)
*H01M 10/46* (2006.01)
*H04L 12/10* (2006.01)

(52) U.S. Cl.
CPC ...... *H04L 12/10* (2013.01); *E06B 2009/6809* (2013.01); *H01M 2220/10* (2013.01)

(58) Field of Classification Search
CPC ...... H01M 10/44; H01M 10/46; H01M 12/10; H01M 2220/10
See application file for complete search history.

(56) References Cited

U.S. PATENT DOCUMENTS

| | | | |
|---|---|---|---|
| 7,389,806 | B2 | 6/2008 | Kates |
| 7,537,040 | B2* | 5/2009 | Carmen, Jr. ............... E06B 9/68 160/120 |
| 7,931,068 | B2 | 4/2011 | Carmen et al. |
| 7,977,904 | B2* | 7/2011 | Berman ................. E06B 9/322 318/480 |
| 8,065,039 | B2 | 11/2011 | Mullet et al. |
| 8,165,719 | B2 | 4/2012 | Kinney et al. |
| 8,723,467 | B2 | 5/2014 | Berman et al. |
| 9,169,690 | B2 | 10/2015 | Blair |
| 9,267,327 | B2 | 2/2016 | Feldstein |
| 9,366,082 | B2* | 6/2016 | Feldstein ................. E06B 9/72 |
| 9,470,040 | B2 | 10/2016 | Hall et al. |
| 9,506,288 | B2 | 11/2016 | Hall et al. |
| 9,546,515 | B2 | 1/2017 | Hall et al. |
| 9,574,395 | B2 | 2/2017 | Hall et al. |
| 9,605,476 | B2 | 3/2017 | Hall et al. |
| 9,624,720 | B2 | 4/2017 | Hall et al. |
| 9,644,424 | B2 | 5/2017 | Slivka |
| 9,661,722 | B2 | 5/2017 | Patel |
| 9,696,693 | B2 | 7/2017 | Element |
| 9,752,383 | B2* | 9/2017 | Lundy ................. E06B 9/68 |
| 2005/0039863 | A1* | 2/2005 | Bruno ................. G05B 19/425 160/130 |
| 2005/0173080 | A1 | 8/2005 | Carmen, Jr. et al. |
| 2009/0308543 | A1 | 12/2009 | Kates |
| 2011/0203748 | A1 | 8/2011 | Mullet et al. |
| 2013/0147367 | A1 | 6/2013 | Cowburn |
| 2013/0322281 | A1* | 12/2013 | Ludlow ................. H04W 48/18 370/252 |
| 2014/0156079 | A1 | 6/2014 | Courtney et al. |
| 2014/0262078 | A1 | 9/2014 | Colson et al. |
| 2014/0376747 | A1 | 12/2014 | Mullet et al. |
| 2015/0285535 | A1* | 10/2015 | Hall ................. E06B 9/308 160/1 |
| 2015/0362896 | A1 | 12/2015 | Feldstein |
| 2015/0368967 | A1 | 12/2015 | Fundy et al. |
| 2016/0041527 | A1 | 2/2016 | Patton et al. |
| 2017/0081916 | A1 | 3/2017 | Greening |
| 2017/0081917 | A1 | 3/2017 | Brunk et al. |

FOREIGN PATENT DOCUMENTS

| | | |
|---|---|---|
| WO | 2015100179 A1 | 7/2015 |
| WO | 2016182879 A1 | 11/2016 |

OTHER PUBLICATIONS

"PowerView® Motorization," HunterDouglas, hunterdouglas.com, accessed: Jul. 2017. https://www.hunterdouglas.com/operating systems/powerview-motorization.

"Lutron works with Apple® HomeKit™: Control Lutron Serena Shades and lights with Siri," Serena, serenashades. com, Jul. 7, 2017. https://web.archive.org/web/20170707230553/https://www.serenashades.com/applehomekit.

"Smart Motorized Z-Wave Blinds and Shades," Zebra Blinds, zebrablinds.com, accessed: Jul. 2017. https://www.zebrablinds.com/smart-homes/smart-motorized-electric-shades.

"Motorize your window shades," Axis, helloaxis.com, accessed: Jul. 2017. http://helloaxis.com/.

"Home," Leviosa Motor Shades, leviosashades.com, accessed: Jul. 2017. https://leviosashades.com/.

* cited by examiner

MOTORIZED SHADE WITH AUTOMATED CONFIGURATION AND CONTROL

CROSS-REFERENCE TO RELATED APPLICATIONS

This application claims the benefit of U.S. Provisional Patent Application No. 62/537,336, filed Jul. 26, 2017, the disclosure of which is hereby incorporated herein in its entirety by reference.

BACKGROUND

Motorized window shades are a convenient and practical accessory for windows, allowing users to selectively cover or uncover portions of the windows as desired. For example, shades on externally facing windows are often fully opened to allow maximum sunlight into a room or area within a building or are partially or fully closed to block direct sunlight into the room or area. Shades are also used on window panels within buildings, such as glass panels defining a wall of a conference room to provide privacy or lighting control when the room is in use.

Conventional motorized window shades typically are dependent on existing building wiring to provide AC power either directly to the shade via a hard-wired or wall plug-in connection, or via a DC converter plugged in to the AC power system. The use of existing wall plug-ins usually necessitates the use of extension cords which detracts from the aesthetic appearance of the installed shades. Otherwise, each individual shade must be located in proximity to a power outlet, or the building wiring must be adapted or extended to provide the required power to each shade. Some conventional motorized shades provide for daisy-chaining power wires from one shade to the next, which requires either modification to building wiring if the electrical wires are to be hidden or requires surface mounting of wires from one shade to the next, disturbing the aesthetic appearance of the shade installation.

In modern buildings, multiple motorized window shades are often used to cover multiple panels of windows, stacked horizontally and vertically. For example, an exterior wall may include three or more stacked rows of windows, each having an individual motorized shade. And atriums or walls of large commercial building may include stacks and rows of windows in various arrangements or shapes, with each window having a separate motorized shade. In such cases, it is often desirable to operate the shades in unison in one or more groups, rather than individually. It is also often desirable to synchronize the opening and closing of groups of shades such that every shade in a group reaches its ultimate end location (whether fully opened, fully closed, or somewhere in-between) at the same time. However, known systems for synchronizing the operation of multiple shades requires complex wiring schemes and/or a centralized control system in order to achieve the desired operation, usually requiring each individual shade to continuously provide its position in real time to a central controller and/or to other shades with which it is supposed to synchronize in order to coordinate the synchronization operation.

For example, U.S. Pat. No. 9,267,327 discloses a motorized roller shade in which wiring for control signals is daisy chained between adjacent window shades so that they can be controlled simultaneously. And U.S. Pat. No. 7,389,806 discloses grouping of a plurality of motorized shades that relies on a central control system to monitor and coordinate the operation of each shade to ensure synchronized operation.

Such known systems are complex to install and are likewise complex to operate and maintain. A failure of a single daisy-chained motorized shade in a grouping of shades can interrupt the operation of all shades within the group while the failed shade is repaired, prohibiting their continued operation. And failure of communication with a central control system can lead to shut-down or inoperability of entire groups of shades or interruption of the synchronization feature. Furthermore, implementation of the synchronization scheme itself is complex as the shades are required to communicate positional information between each other and/or to a central controller that coordinates the synchronization.

Lighting of window shades, particularly exterior lighting to provide decorative effect to buildings, is often implemented as a separate window treatment feature. Because the lighting control system is separate from the shade control system, the complexity of operation is increased as two systems must be operated and maintained. And, any coordination between the lighting and systems is difficult as the systems typically operate independently of each other.

Thus, it can be seen that there remains a need in the art for motorized shades that do not require building electrical power wiring or outlets and that provide for simple, reliable operation in any mode, whether individually, in groups, or in synchronized operation, that do not require building power, and that provide for coordinated lighting features.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a motorized shade with automated configuration and control.

A motorized roller shade configured to connect to a power over Ethernet network includes a motor for rotating the shade to roll and unroll shade material to and from a roller tube to raise and lower the shade. A rechargeable battery positioned in the roller tube provides power to the motor and to logic and control circuitry also positioned within the roller tube. The logic and control circuitry charges the battery though power derived from the power over Ethernet network, and controls the operation of the motor to achieve a desired target velocity. Synchronized operation of multiple motorized roller shades is achieved though autonomous operation of the shades by their corresponding logic and control circuitry. In exemplary embodiments, a lighting element controlled by the logic and control circuitry allows controlled lighting of the shade.

Thus, the motorized shade of the present invention provides an internal rechargeable battery that derives power from a power-over-Ethernet (POE) network. The POE network allows communication to any of the individual shades in room, area or building. The shade includes onboard logic and control circuitry that controls charging of the battery and operation of the motor, with onboard memory storage of operational and physical parameters relating to the shade.

Synchronization of movement of multiple shades is achieved by triggering a coordinated start time of operation, with each individual shade ensuring that its own speed of movement is maintained at the desired operational speed and automatically adjusting for any variance so that all shades move in coordinated relationship.

Further exemplary embodiments include a lighting element in communication with the logic and control circuitry that can be controlled in a manner similar to that of the operation of the roller shade portion.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value in the form of changes or deviations that are insignificant to the function.

Embodiments of the invention include motorized roller shades for selectively covering and uncovering windows or other panels by rolling and unrolling shade material from a cylindrical roller tube such that the shade raises or lowers to a desired position. Power to the shades is provided over a power-over-Ethernet (POE) network which additionally allows communication between the shade and local or cloud server.

Various embodiments for powering and communicating to shades and groups of shades are provided, permitting the operation of single shades, groups of shades, or multiple groups of shades to open and close according to desired schedules or events, and to achieve synchronization of the raising and lowering of multiple shades and groups of shades. In addition to the operation of the shades, alternative embodiments provide for lighting assemblies within the shades with the light color and intensity similarly controllable by a user and according to a desired schedule or event.

Figure 1:
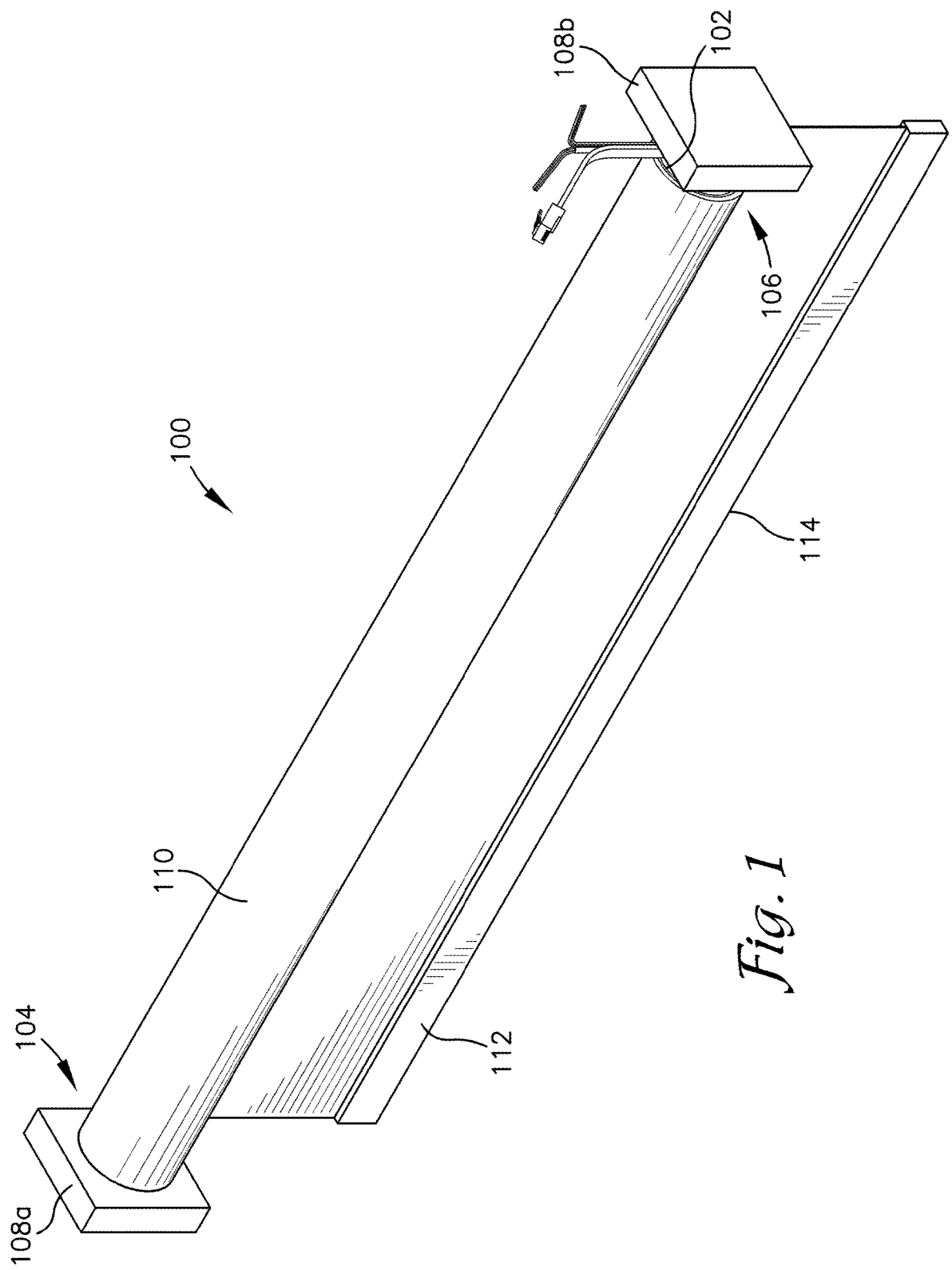
FIG. 1 is a perspective view of a motorized roller shade in accordance with an exemplary embodiment of the present invention.

Looking first to FIG. 1, a motorized roller shade in accordance with a first exemplary embodiment of the present invention is designated generally by the numeral 100. The shade comprises a cylindrical roller tube 102, extending between a first end 104 and a second end 106, supported at each end by corresponding first and second mounting brackets 108*a*, 108*b*.

A flexible shade material 110 is wound or rolled around the cylindrical roller tube 102, with an inner end (not visible in this view) of the shade material 110 attached to the cylindrical roller tube 102, with the outer, free end 112 of the shade material 110 unattached, extending from and hanging freely downwardly from the tube 102. The free end 112 of the shade material is preferably hemmed or otherwise finished, with a bar 114 or weight preferably attached to or inserted into a pocket formed at the free end 112.

Shade material 110 is preferably a flexible material, such as a vinyl, plastic, cloth, or woven material, with light transmissive properties selected according to a desired application. For example, shade material 110 may be opaque in applications where the shade is intended to block light and may be translucent in other applications. Similarly, shade material 110 may be a tinted sunscreen material, and/or may include patterns imprinted upon the material. Bar 114 serves to keep the free end 112 of the flexible shade material 100 straight as it extends across the width of the roller shade 100 and further provides weight to the free end to keep the shade material 110 pulled taut as it hangs from the cylindrical roller tube 112. In alternative embodiments, the bar 114 may be of other desired sizes or shapes, such as the rectangular shape shown in the exemplary embodiment of FIG. 1, or may be cylindrical, and may vary in weight depending upon the specific application and shade material used. With the shade material 110 rolled around the cylindrical roller tube 102, the shade can thus be lowered and raised to cover and uncover a window or panel via a motor assembly and control circuitry mounted within the cylindrical roller tube operable to rotate the cylindrical roller tube to roll and unroll the flexible shade material as will now be described.

Figure 2:
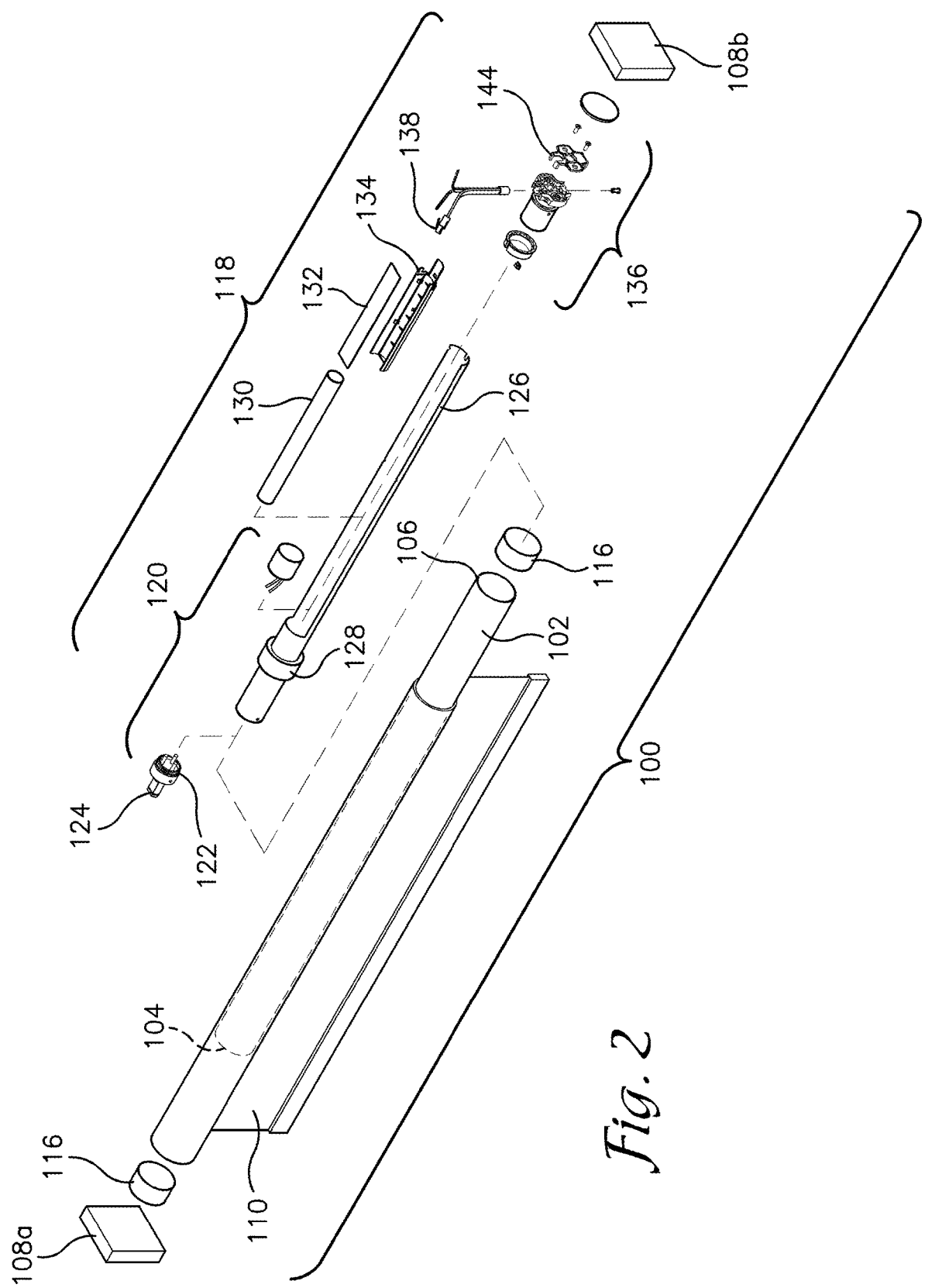
FIG. 2 is an exploded view of the motorized roller shade of FIG. 1.

Turning to FIG. 2, an exploded view of the motorized roller shade 100 of FIG. 1 depicts the cylindrical roller tube 102 extending between first 104 and second 106 ends, supported at each end by corresponding first and second mounting brackets 108*a*, 108*b*, with the flexible shade material 110 wound around the tube, all as described above with respect to FIG. 1. The mounting brackets 108*a*, 108*b* allow the motorized roller shade 100 to be attached, for example, to the interior or exterior frame around a window or panel with which the shade will be used.

An idler roller 116 positioned at the first end 104 of the cylindrical roller tube 102 inserts into, and attaches to, the first end 104 of the cylindrical roller tube 102. The idler roller 116 is rotatably attached to the first mounting bracket 108a, allowing the first end of the cylindrical roller tube to freely rotate while supported. A motor shaft drive adapter 116 inserts into the second end 106 of the cylindrical roller tube 102 and engages with the interior surface of the cylindrical roller tube 102 so that rotation of the motor shaft drive adapter 116 causes rotation of the cylindrical roller tube 102.

An integrated control assembly 118 is positioned within the interior of cylindrical roller tube 102. The integrated control assembly 118 comprises a motor assembly 120 coupled to the motor shaft drive adapter 116. The motor assembly 120 includes a motor 122 with an extending shaft 124 operable to rotate the drive adapter 118 so that the cylindrical roller tube 102 correspondingly rotates to roll or unroll shade material 110 onto or off of the cylindrical roller tube 102, depending on the direction of rotation of the motor 122, to either raise or lower the shade.

The motor assembly 120 is positioned at one end of a support tray 126, with the shaft 124 of the motor 122 extending outwardly to engage with the motor shaft drive adapter 116. A ring-shaped roller tube crown adapter 128 positions the motor assembly 120 within the cylindrical roller tube 102 so that the motor 122 and tray 126 are suspended along the axis of the cylindrical roller tube 102, away from the interior wall of the cylindrical roller tube 102.

The support tray 126 further houses a lithium ion battery 130 and a circuit board 132 comprising control and logic circuitry for operating the motor 122, preferably using a pulse width modulation (PWM) scheme. The motor 122 preferably includes an internal encoder, Hall-effect transducer, or other sensor that provides the logic and control circuitry with information relating to the angular position of the motor so that the logic and control circuitry can monitor and determine the position of the shade based on data received from the encoder. Operating parameters for the motor 122 are preferably stored in a non-volatile memory in the logic and control circuitry as will be discussed in more detail below. A bracket 134 attaches the circuit board 132 to the support tray 126. A hub assembly 136 is attached at the end of the support tray 126 and is configured to insert into the second end of the cylindrical roller tube 102 and attach to the second mounting bracket 108b to support the second end of the cylindrical roller tube 102 and to allow the tube 102 to rotate as it is driven by the motor 122.

The hub assembly 136 includes interface circuitry in communication with the logic and control circuitry on the circuit board 132, provides an exit point for external wiring connections to the logic and control circuitry, including a power over Ethernet (POE) pigtail connector 138, which provides an Ethernet and power connection with internal wiring extending to the circuit board 132. The POE pigtail connector 138 allows the shade to be connected to standard POE network wiring, such as Cat 5/Cat 6 cabling or equivalent.

The hub assembly 136 also includes externally accessible wiring conductors, including serial expansion conductors 140 and dry contact conductors 142 which extend through the hub and to the logic and control circuitry on circuit board 132. The serial expansion conductors 140 allow connection of an external device capable of communicating over the conductors via serial protocol with the logic and control circuitry on circuit board 132, the dry contact conductors 142 similarly allow connection of external switch or sensor contacts, such as window alarm switches or sensors, the state of which are detected by the logic and control circuitry. A wiring bracket 144 attaches the external conductors to the hub assembly.

Figure 4:
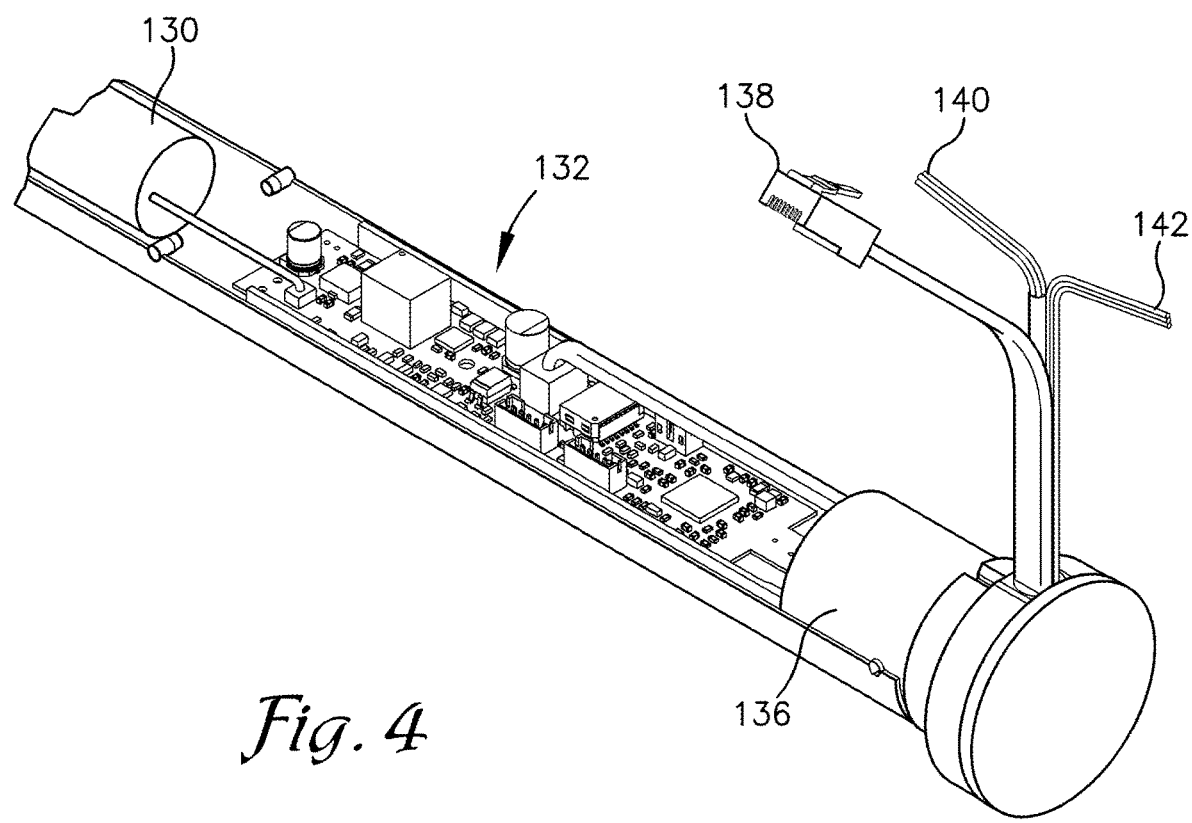
FIG. 4 is a close-up assembled view of the battery, circuit board, and hub of the motorized roller shade of FIG. 1.

Looking to FIG. 4, a close-up detailed view of a portion of the integrated control assembly 118 shows the lithium ion battery 130, circuitry board 132 with individual components of the logic and control circuitry mounted thereon, and the hub assembly 136, with externally accessible wiring conductors including POE pigtail 138, serial expansion conductors 140, and dry contact conductors 142.

With the structure of the motorized roller shade 100 set forth, and looking to FIGS. 1 through 4 in conjunction, it can be seen that operation of the motor 122 by the logic and control circuitry on the circuit board 132 will rotate the motor shaft drive adapter 116 to correspondingly rotate the cylindrical roller tube 102. Rotation of the cylindrical roller tube 102 acts to roll or unroll (depending on the direction of rotation of the motor 122) shade material 110 onto or off of the cylindrical roller tube 102, thus raising or lower the free end 112 of the shade material—i.e., raising or lowering the shade.

With the motorized roller shade 100 connected to a POE network via the POE pigtail connector 138, the logic and control circuitry is operable to communicate over the network and to receive power from the POE network through the POE pigtail connector 138. The logic and control circuitry preferably includes charging circuitry that provides a continuous trickle charge to the lithium ion battery 130 derived from the power provided over the POE network. The charged lithium ion battery 130 provides power to the logic and control circuitry and to the motor 122 even in the absence or interruption of the POE connection, such as a failure of a POE switch in the network. Preferably, the lithium ion battery 130 provides adequate storage capacity to power at least thirty full cycles of the shade (i.e., from a fully raised position to a fully lowered position, or vice versa) in the absence of POE power.

Most preferably, the logic and control circuitry is configured to communicate with a local or cloud-based server using standard TCP/IP protocols, such as via standard TCP or UDP ports. In an exemplary embodiment, the logic and control circuitry of the shade establishes communication to a server using Domain Name System (DNS) protocol, allowing each of multiple individual motorized roller shades to communicate to either a local or cloud-based server without user interaction.

Preferably, each motorized roller shade 100 will establish communication to the cloud server using TCIP-IP communication and the MQTT protocol. Shades preferably publish and subscribe to necessary information to and from the server as required. Each motorized power shade is preferably able to operate in low energy and low bandwidth modes to minimize communication with the server.

In exemplary embodiments, each motorized roller shade is assigned an IP address and DNS server address location via a standard DHCP protocol. DNS servers such as Google's® public DNS server could be used, allowing the shades to communicate with a host cloud server. In other exemplary embodiments, a local DHCP server is used and assigns addresses to the shades using standard DHCP and domain name resolution protocols. Use of a local server acts to reduces the traffic to a cloud server as information is transmitted only within the local network.

In other embodiments, the logic and control circuitry of the motorized roller shade includes whitelist capability defining specific IP addresses from which the logic and control circuitry will accept communications, restricting access by unauthorized addresses, and preventing unauthorized control of the shade. Preferably, the whitelist addresses are preconfigured during commission or installation of the shade, or are downloaded by an authorized user of the shade into the non-volatile memory of the logic and control circuitry.

The logic and control circuitry preferably includes a microprocessor, microcontroller, or other logic executing circuitry operable to perform programmed steps or commands, and includes logic and/or instructions for executing bootstrap protocol (BOOTP) to allow individual motorized roller shades to autonomously and dynamically configure communication without user supervision or action. The use of bootstrap protocol allows centralized management of network addresses, eliminating the need for separate, per-host, unique configuration files. Other protocols, such as UPnP (universal plug and play), SDDP (simple device discovery protocol), and SSDP (simple service discovery protocol) may also be used.

The logic and control circuitry on the circuit board 122 preferably includes non-volatile memory that stores various shade and configuration parameters, including limits, memory positions, speed, schedules, target velocity, server hostname, network statistics, and other operational and physical parameters. Most preferably the stored parameters allow the logic and control circuitry to operate the shade autonomously in cases where network communication to the local or cloud server is interrupted. Clock circuitry within the logic and control circuitry allows the shade to continue to operate according to preprogrammed schedules without connection or initiation from a central server. Preferably, the clock circuitry synchronizes with a master clock on a local or cloud-based server periodically so that multiple motorized roller shades rely on, and update based on, a common clock signal. Information from the shade may likewise be sent over the POE network to a local or cloud-based server for storage, aggregation, or use by the server. Thus, a shade's position or operational status may be relayed to the server periodically, historical performance data of the shade may be stored, and information about the shade may be sent to users in communication with the server, for example, to monitor whether a shade is raised or lowered.

In further exemplary embodiments, the motorized roller shade includes one or more accelerometers in communication with the logic and control circuitry, operable to detect movement of the shade assembly and/or of the shade roller. In one aspect, detected movement may be indicative of tampering with the shade in which case the logic and control circuitry may provide an alert across the POE network. In a further aspect, detected movement may be indicative of a jammed shade, in which case the logic and control circuitry may shut down the motor. In further aspects, the logic and control circuitry may capture a signature or pattern of movement and vibration of the shade as the shade is operated over a full cycle. The logic and control circuitry compares the recorded signature to subsequently captured signatures to ensure consistent operation of the shade and to detect anomalies in operation causing a variance in the operational signature.

Most preferably, an individual shade's parameters are pre-configured by storing information in the non-volatile memory of the logic and control circuitry during the manufacturing process so that a shade arrives on site ready to install, with no further field configuration required. In addition to the parameters listed above, the pre-configured shade parameters may include physical or environmental attributes such as room location, dimensions, color, and type. Preferably, the parameters are entered via a web application by a customer or sales representative and transferred to manufacturing servers for use during manufacturing of the shades. Thus, the shades arrive on-site set-up and ready to install.

In operation, a shade is operated by providing a command over the POE network to raise or lower the shade or move the shade to a desired position. In exemplary embodiments, the command may be issued from a computer device connected to the POE network, or may be relayed to the POE network though a local or cloud-based server. In other embodiments, a handheld smart device in communication with the local or cloud-based server may be used to issue commands to control individual shades. Software on the device and/or on the server may also define groups of shades that can be operated in unison, and may define scenes which operate various shades or groups of shades in desired sequences. For example, a raise command may be issued to an individual shade or to a group of shades simultaneously. A scene may define that a first group of shades is raised, followed by a second group of shades, and then a third group, and so forth.

Figure 5:
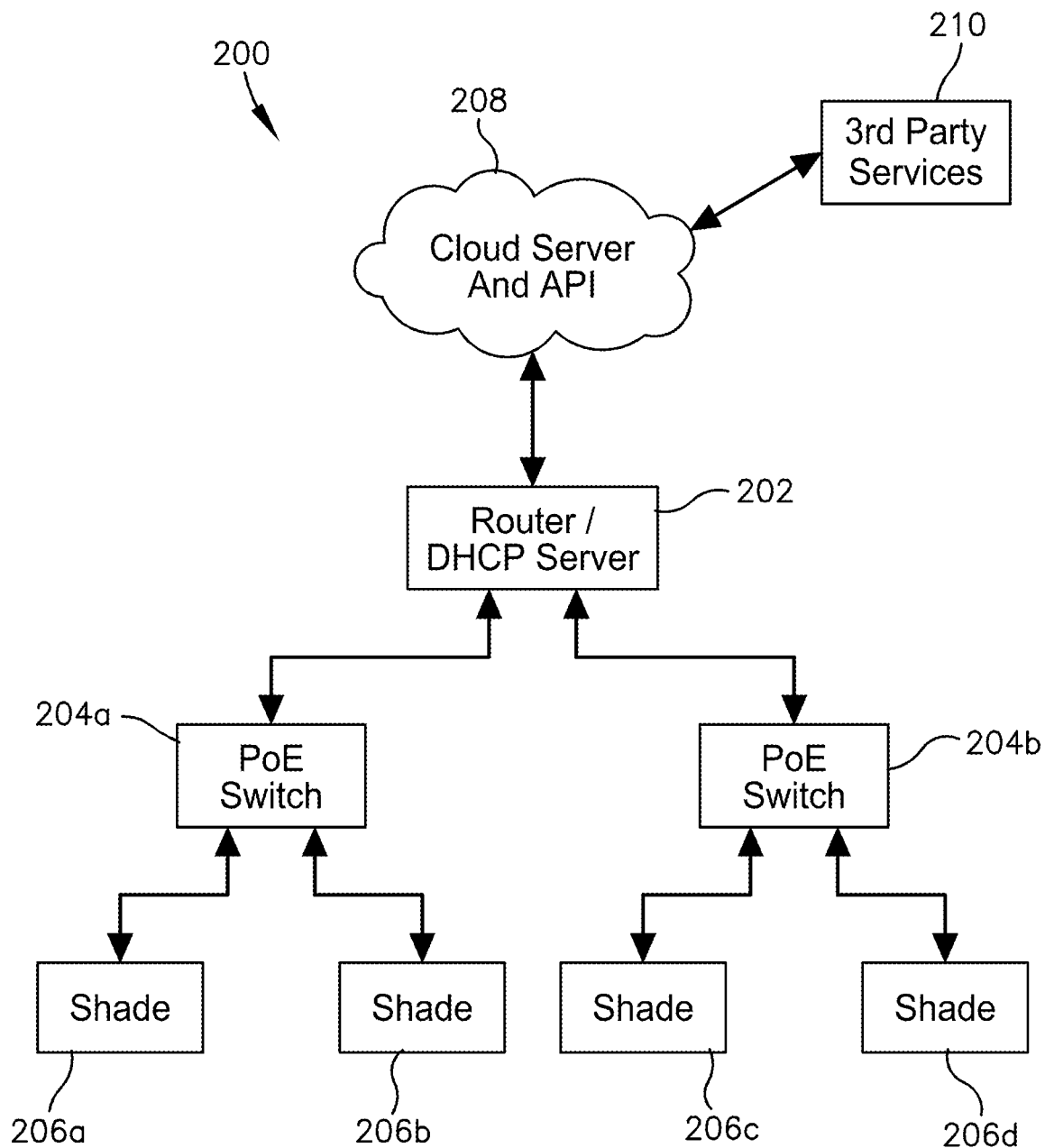
FIG. 5 is a block diagram of a server, network, and shades in accordance with an exemplary embodiment of the present invention.

Turning to FIG. 5, a block diagram of an exemplary network for controlling multiple motorized roller shades such as shade 100 just described, is depicted generally as numeral 200. The network 200 is preferably a POE network providing power and communication capability as previously described and as known in the art.

Network 200 comprises a router/DHCP server 202 connected to a plurality of POE switches 204a, 204b, with a plurality of motorized roller shades 206a, 206b, 206c, 206d, connected to the POE switches 204a, 204b. Router 202 is in communication with a cloud server and API 208 which allows third party services 210 to communicate with the cloud server 208 to send commands to the network-connected shades 206a, 206b, 206c, 206d via the router 202. Third party services may include various smart home and convenience control devices such as Amazon's® Echo® device, SmartThings controllers, IFTTT application, and other control devices including handheld smart devices such as smartphones, tablets, and computers.

The configuration and arrangement of network 200 shown is exemplary in nature and variations and other configurations of connecting the router 202, POE switches 204a, 204b, and shades 206a, 206b, 206c, 206d will be apparent to those skilled in the art, such as a network having one or more hardwired control devices. In other embodiments, router 202 may be configured on a local network with a local server and provide a local Wi-Fi interface.

It should be understood that while commands to raise or lower shades are triggered by commands received over the POE network, the operation of the motor and the raising or lowering of the shade once the command is received occurs autonomously within each individual motorized roller shade, even within a group of shades. Thus, while a command to raise the shade may be issued to a group of shades and is sent to the multiple IP addresses corresponding to those shades, the actual raise operation occurs within the logic and control circuitry of each of the individual shades and is not controlled or otherwise coordinated in real time by the server. And, it should be further understood that events may also be, or may alternatively be, initiated by the individual shade based on a downloaded schedule or other timed event, or may be initiated by one or more external sensors attached to the shade.

In alternative embodiments, each shade, or any individual shade within a group of shades, may include a local switch allowing operation of the shade via a physical control switch placed in proximity to the shade. The switch may be hardwired into the logic and control circuitry via the externally available conductors, such as to the dry contact or serial interface conductors, or may be wired to the POE network with commands sent to the desired shade.

In further embodiments, a motorized roller shade in accordance with the present invention is commissioned, installed, or setup via a mobile application running on a mobile smart device, such as an iOS or Android device. For example, an installer will download an application on his or her phone that allows the configuration of the top and bottom positions of the shade, the shade name, and assign the shade to a group, scene, or assign schedules using the application. Most preferably, data collected via the mobile application during shade commissioning will further be uploaded and stored to the cloud for use in statistical analysis, customer support, service, and warranty purposes.

In other embodiments, motorized roller shades may be operated by a user using a mobile application running on a smart device so that shades may be moved to position, paired, or jogged as desired. Preferably a user of the mobile application can similarly set top and bottom positions, assign shade names, assign groups, assign scenes, and assign schedules by using the application, and can receive notifications of shade activity through the application.

In alternative embodiments, the motorized shade is controlled via a radio-frequency Gateway, with functionality substantial the same as that just described with respect to the POE network.

In further exemplary embodiments, near field communication, BLE proximity profile, or other wireless communication identification technologies may be used to automatically initiate a POE command to activate shade movement according to predefined groups or according to scenes defining a desired operation of multiple shades. Other technologies may similarly be employed to allow operation of the shades based on facial recognition, voice commands, and detection of other parameters, such as light levels in the room. Control via those various sensors preferably occurs over the POE network as described above.

The serial expansion conductors 140 and dry contact conductors 142 that extend from the hub assembly 136 and communicate with the logic and control circuitry allow connection of external modules or sensors and switches that can trigger operation of the shade.

For example, a temperature sensing thermistor may trigger closing of the shade if a detected temperature exceeds a predetermined threshold, such as if a window has been left open, and the logic and control circuitry can lower the shade to minimize the airflow and the heat or cooling loss through the open window. Other sensors can likewise interface to the shade via the serial expansion conductors 140 and dry contact conductors 142, including photocells, to detect light levels, piezo electric sensors to detect glass breakage, motion sensors to detect movement, humidity sensors to detect humidity levels and rain, and smoke and carbon monoxide detectors. Each of these sensors can trigger a predetermined action of the shade to which the sensor is attached, for example, lowering the shade upon sensing too much light in the room. The sensor information can likewise be transmitted from the logic and control circuitry over the POE network which may trigger additional actions.

For example, detection of glass breakage by a piezo electric sensor attached to a single shade may trigger that individual shade to raise fully. And, that glass breakage detection may be relayed to a local or cloud-based server which in turn issues a command to the entire group of shades in that building to fully raise. Thus, the glass breakage detection by a single shade sensor may trigger the full raising of all shades in the building to provide a visual signal to those inside or outside of the building of the detected condition and potential security breach. Similar actions can likewise be triggered by other sensors and predetermined conditions and parameters of the logic and control circuitry. Further, the relay of the detection by the logic and control circuitry to the server may also trigger an alert to a user in communication with the server, such as an alert sent to the user's mobile device.

As discussed above, the logic and control circuitry is operable to control the operation of the motor to raise and lower the shade using PWM circuitry and based on various parameters preconfigured into the non-volatile memory or downloaded into the memory upon commissioning the shade into operation.

Preferably, each motorized roller shade is configured to operate at a predetermined target velocity. For example, three different shades having the same length—e.g., sixty inches long—each with a different diameter cylindrical roller tube—e.g., 1.5 inch, 2 inch, and 3.5 inch—will each be programmed to reach fully closed position in the same time period—e.g., 10 seconds. Because of the different diameter cylindrical roller tubes on each, the angular velocity and/or duty-cycle of the motor will be different for each shade so the shade can achieve the target velocity. Thus, while each shade will reach its fully lowered position in 10 seconds, each will do so autonomously, without reference to the operation of the other shades. Thus, shades of varying sizes and materials, weights, etc., can all operate according to a common timing requirement, with the logic and control circuitry of each shade providing the appropriate PWM commands to its motor to achieve the desired speed. Preferably, the target velocity is stored in the non-volatile memory of the logic and control circuitry of the shade. Most preferably, the target velocity can be changed or adjusted via download through the POE network according to a user's preference. The IP protocol can be TCP or UDP. The IP command can originate from local server, cloud server, mobile app, voice user interface, etc.

In a preferred embodiment, each motorized roller shade is manufactured and pre-configured with a predetermined target velocity, i.e., a speed at which the shade will move in raising and lowering. During operation, the logic and control circuitry measures the velocity of the motor using an encoder internal to the motor or using a Hall Effect sensor or other device. During movement of the shade, the logic and control circuitry records the time that it takes for a shade to move from a first position to a second position and calculates the difference between the recorded actual time for the movement and the stored target time, and autonomously adjusts the target velocity to compensate for the discrepancy. eliminate any discrepancy. That monitoring and adjustment occurs on every cycle of the shade so that velocity of the shade is continually adjusted to achieve the target velocity. Thus, the logic and control circuitry compensates for degradation of the motor over time, and can further compensate for changes in the weight of the shade material, adjusting the control of the motor to achieve a constant velocity during every operation of the shade. In one aspect, the compensation adjusts for mechanical for mechanical degradation over the life of the shade.

Figure 6:
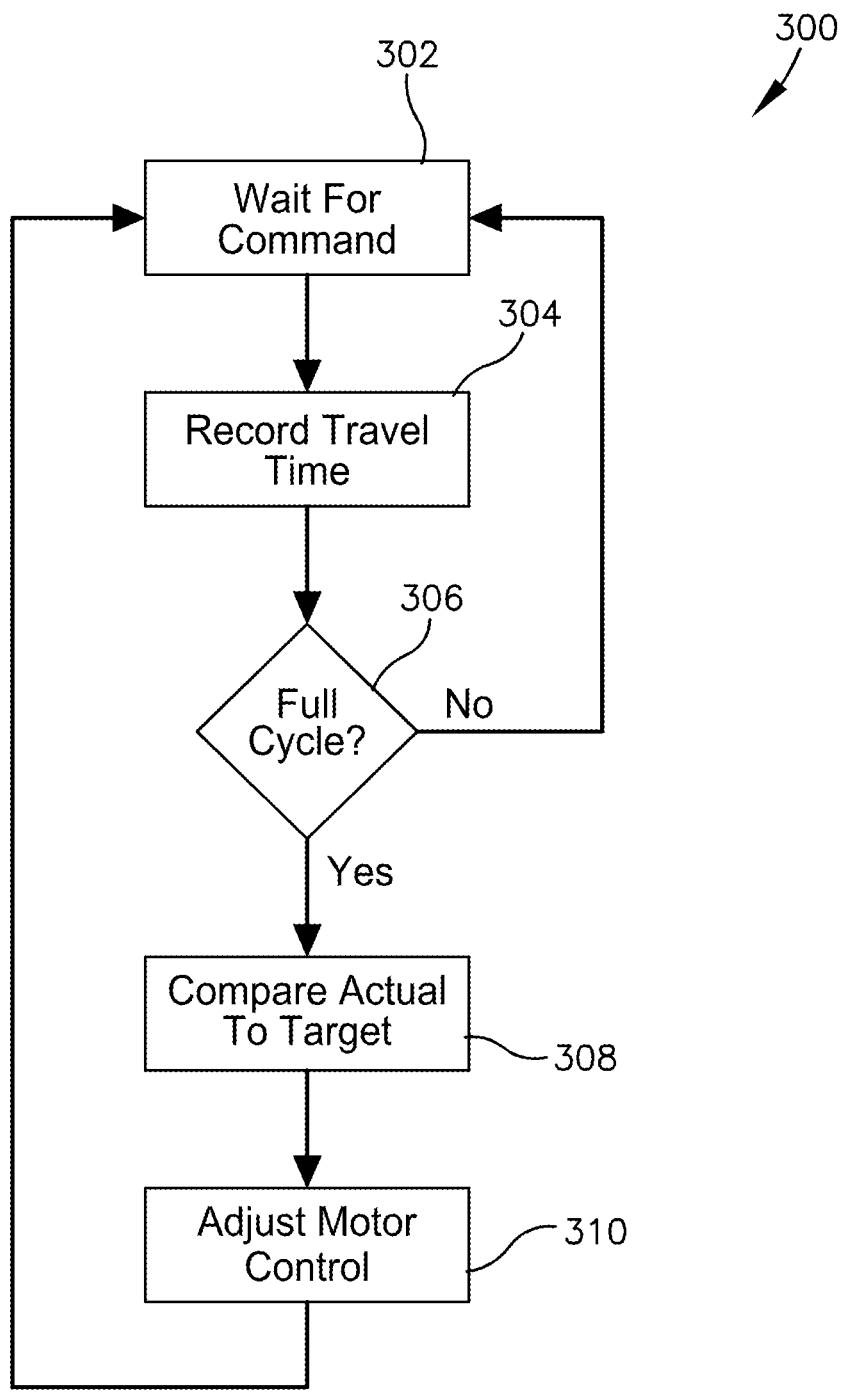
FIG. 6 is a flow diagram of logic steps of an automated velocity adjustment of a motorized roller shade in accordance with an exemplary embodiment of the present invention.

Looking to FIG. 6, a flow diagram of an exemplary velocity compensation scheme as just described and implemented in the logic and control circuitry is depicted generally by the numeral 300. At block 300, the system waits for a command to be sent to the shade commanding movement. Upon receipt of a command, at block 304 as the command is executed (e.g., the shade is moved) the total travel time is recorded. At block 306, if a full cycle of the shade occurred (either from fully raised to fully lowered, or vice versa), then at block 308 the actual travel time is compared to the target travel time. At block 310, if there is a discrepancy in the actual versus the target travel time, then the PWM motor control is adjusted to compensate for that discrepancy. If, at block 306, a full cycle was not completed, then no comparison or compensation occurs, and the flow returns to block 302 to wait for another command.

During the simultaneous operation of multiple motorized roller shades it is desirable for the movement of all of the shades to occur in synchronization. Thus, when a group of shades positioned adjacent to each other, such as on a row of adjacent windows, users find it aesthetically pleasing when all of the shades raise and lower in unison with the bottom edges of the adjacent shades aligning as depicted in FIG. 8, rather than each shade starting and stopping at different times with the bottom edges of the shade misaligned as depicted in FIG. 7.

Figure 7:
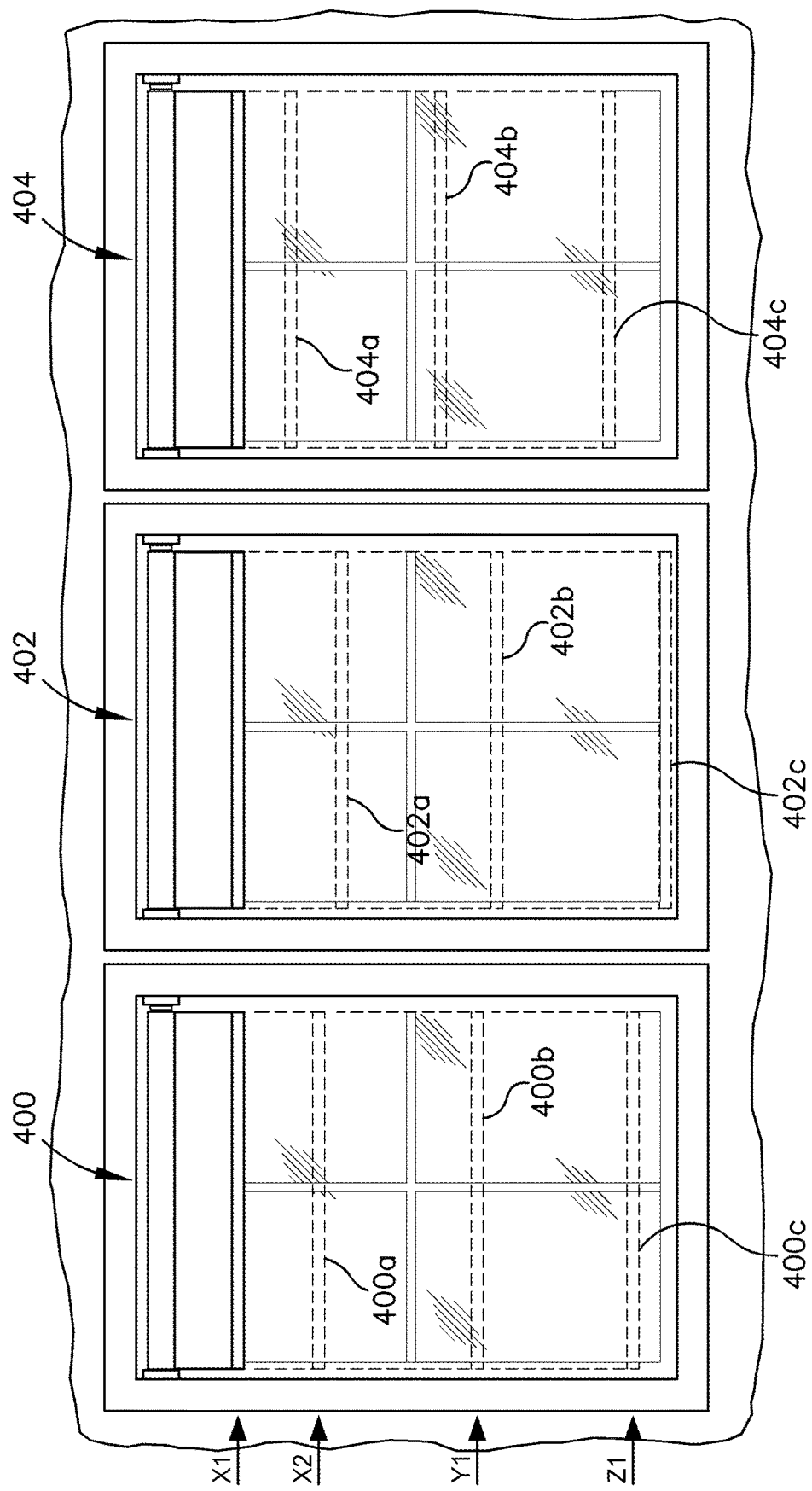
FIG. 7 is an environmental view of the operation of prior art motorized roller shades without synchronization.

Looking to FIG. 7, the unsynchronized operation of a group of three shades 400, 402, and 404 is depicted. At time X1, all three of the shades are in their fully raised, or open positions, with the lower edge of each shade 400a, 402a, 404a aligned. Upon receipt of a command to move to the fully closed position, each shade begins to move. At time X2, shortly after the command for movement, the lower edges of the shades 400b, 402b, 404b are misaligned. The misalignment can occur due to variance in the speed of the shades, variance in the actual start time of movement between the shades, variance in the weight of the shade material, or numerous other factors.

At time Y1, the variance is further evidenced, with the lower edges of the shades 400b, 402b, 404c further misaligned, and at time Z1 the lower edges 400c, 402c, 404c are yet further misaligned, with shade 402 having completed its cycle to fully closed while shades 400 and 404 are still partially open.

Figure 8:
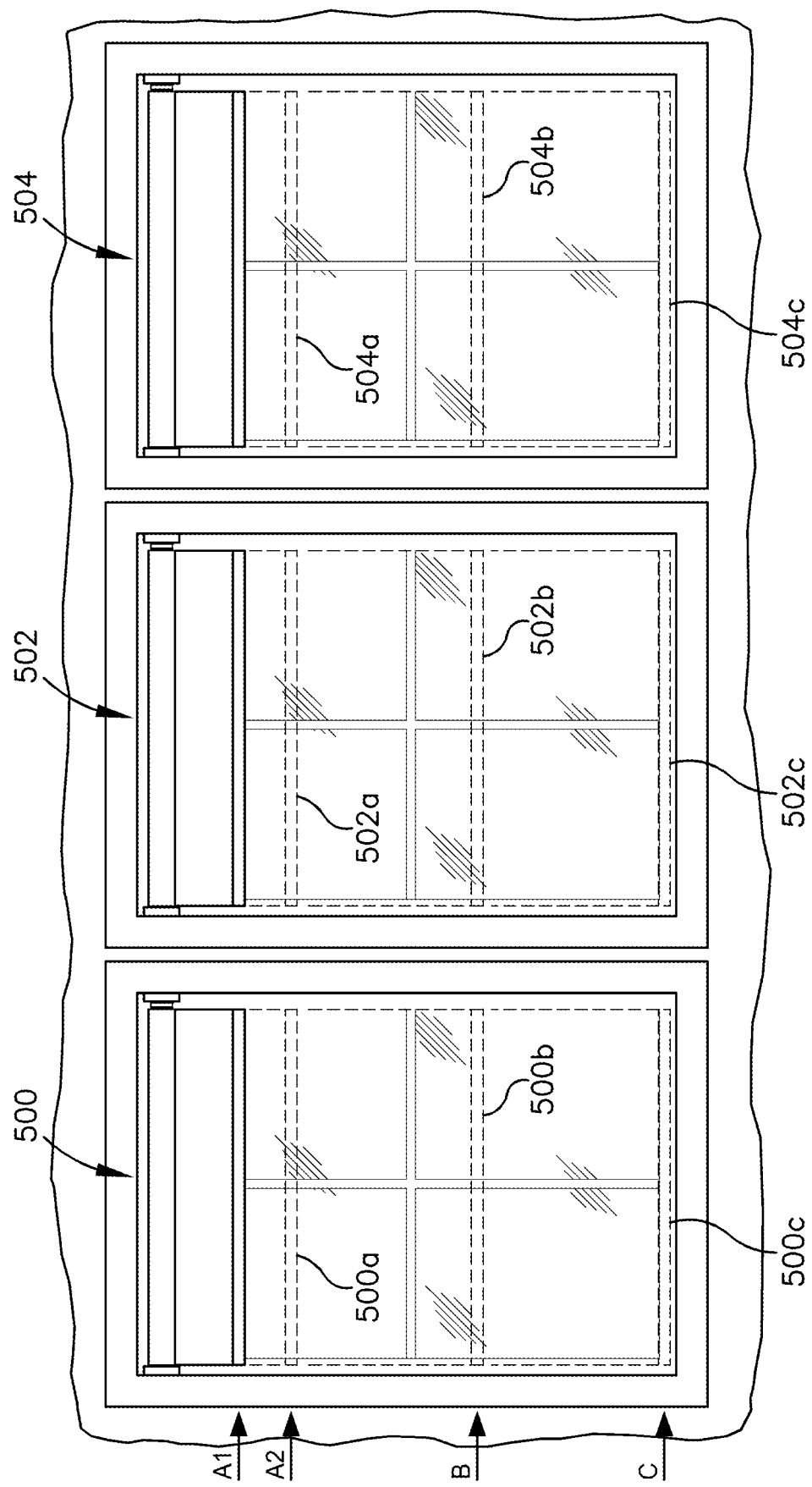
FIG. 8 is an environmental view of the synchronized operation of motorized roller shades in accordance with an exemplary embodiment of the present invention.

Looking to FIG. 8, the synchronized operation of a group of shades 500, 502, 504 according to an exemplary embodiment of the present invention is depicted. Because the logic and control circuitry of each individual motorized roller shade 500, 502, 504 autonomously ensures that it maintains a desired velocity as described above, synchronization of simultaneous movement of multiple shades is achieved by further ensuring that each of the multiple shades starts its movement beginning at the same time and reaches the desired speed within a very short time of starting movement.

As discussed above, the logic and control circuitry of each motorized roller shade includes clock circuitry that maintains a real-time clock that is periodically synchronized to a time signal on a local or cloud-based server, or to a time server. Thus, each shade in a building, group, or facility in communication with a common server and/or time server over the POE network will all periodically update their local clocks to correlate with the server's time signal. As is known in the art, synchronization of clock signals to a time server takes into account network communication latency between the time server and each device—i.e., each motorized roller shade—such that each shade receives and stores or updates to a correct and synchronized time signal which is used to set the internal clock of the logic and control circuitry.

With the clocks in each of multiple roller shades thus synchronized, a start (or raise, or lower) command issued over the POE network to the IP addresses of each shade is initiated by user command via a smart device, computer, or by a schedule operating on the server as previously described. The command from the device triggers the issuance of a start time command by the server to each of the multiple motorized roller shades, with the commanded start time being set to a time in the future, preferably within 1000 milliseconds of issuance. That delay, or dwell time, from the actual issuance of the command allows time for the command to be received by each of the individual motorized roller shades and to prepare for execution of the command by storing the desired start time and waiting for that time to occur. Thus, any latency in communicating with any of the multiple shades is inconsequential as compared to the discrepancy that would occur if each shade received the start command at a different time (due to network latencies) and started movement immediately upon receipt of the command.

Continuing the example, and referring again to FIG. 8, with each of the multiple motorized roller shades 500, 502, 504 having received the start time command, when the commanded start time is reached in the shade's clock circuitry each shade autonomously commands movement of its motor, accelerating the shade from its initial position at time X1 to a short target position within a fixed time period X2, then continuing movement of the shade at constant velocity as described previously. Because each individual shade accelerates to the target position within a fixed time period X2 and then moves at a constant velocity, the movement of each of the multiple shades is essentially identical and synchronized, with no discernible difference in the rate of movement of each shade and no discernible difference in the alignment of the lower edges of the shade material as each of the multiple shades moves simultaneously. It should be understood that the synchronization of the multiple shades occurs with each shade operating autonomously. The shades do not communicate positional or any other data to other shades to achieve the synchronization, and do not communicate in real time with a central server that coordinates the movement of the multiple shades.

Figure 9:
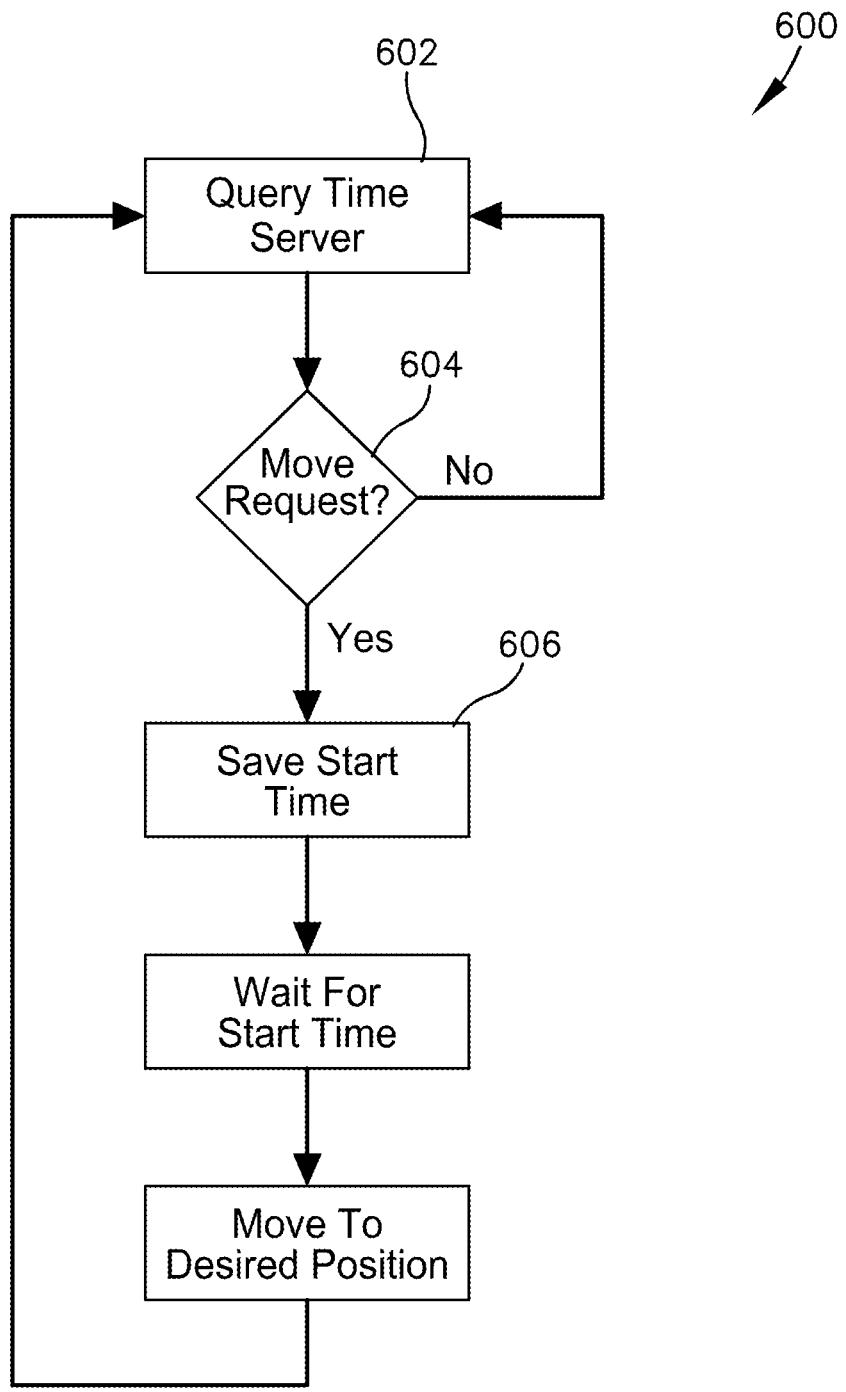
FIG. 9 is a flow diagram of logic steps of synchronized operation of a plurality of motorized roller shades in accordance with an exemplary embodiment of the present invention.

Looking to FIG. 9, an exemplary implementation of the synchronization scheme on a motorized roller shade as just described is depicted in a flow diagram 600. Initially, as described previously, at block 602 the logic and control circuitry of the shade periodically queries a server or time server for a clock synchronization signal and updates the local real-time clock signal, so that every shade in the network maintains a synchronized clock.

At decision block 604, if the shade has not received a move request, it continues its periodic clock synchronization, and may perform other background or communication tasks.

At block 604, if the shade has received a move request, then at block 606 the logic and control circuitry saves the desired start time and at block 608 waits until the real-time clock signal matches the desired start time. At block 610, when the time match occurs, the logic and control circuitry begins movement of the shade at the target velocity as previously described.

With each of multiple shades commanded to move, they will each start movement at the same time and will each move at the same velocity, and thus will all move in synchronized unison. For example, a user may issue a request via a computer, mobile device, or other controller in communication with the server, to move the shades in a group "A" to fifty percent open. The server receives the request and identifies the shades in Group "A" as comprising three individual shades—shade 1, shade 2, and shade 3—and sends a command to shade 1, shade 2, and shade 3, using each shade's individual IP address, to move to fifty percent open at a time 1000 milliseconds in the future.

Upon receipt of the command, the logic and control circuitry of each individual shade saves the desired start time of the command, and compare the commanded start time with the local real time clock signal of the logic and control circuitry. Once the commanded start time occurs (i.e., 1000 milliseconds from the time the command was issued by the server), then each shade will autonomously begin movement to the desired level (i.e., open to fifty percent). Because each shade starts at the same time, and because each shade moves at a constant velocity as described above, each of the entire Group "A" of shades (shades 1, 2, and 3) thus begin moving in unison and continue to move in unison over their entire movement to the commanded fifty percent open.

As discussed above, the 1000 millisecond delay or dwell time built into the command issued by the server ensures that even if shades 1, 2, and 3 receive the command at different times that each will still start its movement at the commanded time signal time. Thus, even if shade 1 receives its command 200 milliseconds after issuance by the server due to network latencies, and shade 2 receives its command 400 milliseconds after issuance, and shade 3 receives its command 600 milliseconds after issuance, each will respond to the command at the occurrence of 1000 milliseconds from issuance, thus any network latencies and differences in communication time to each of shades 1, 2, and 3 are eliminated. The shades move in synchronized unison without any communication between each other, and without real-time communication of positional information to the server.

Figure 3:
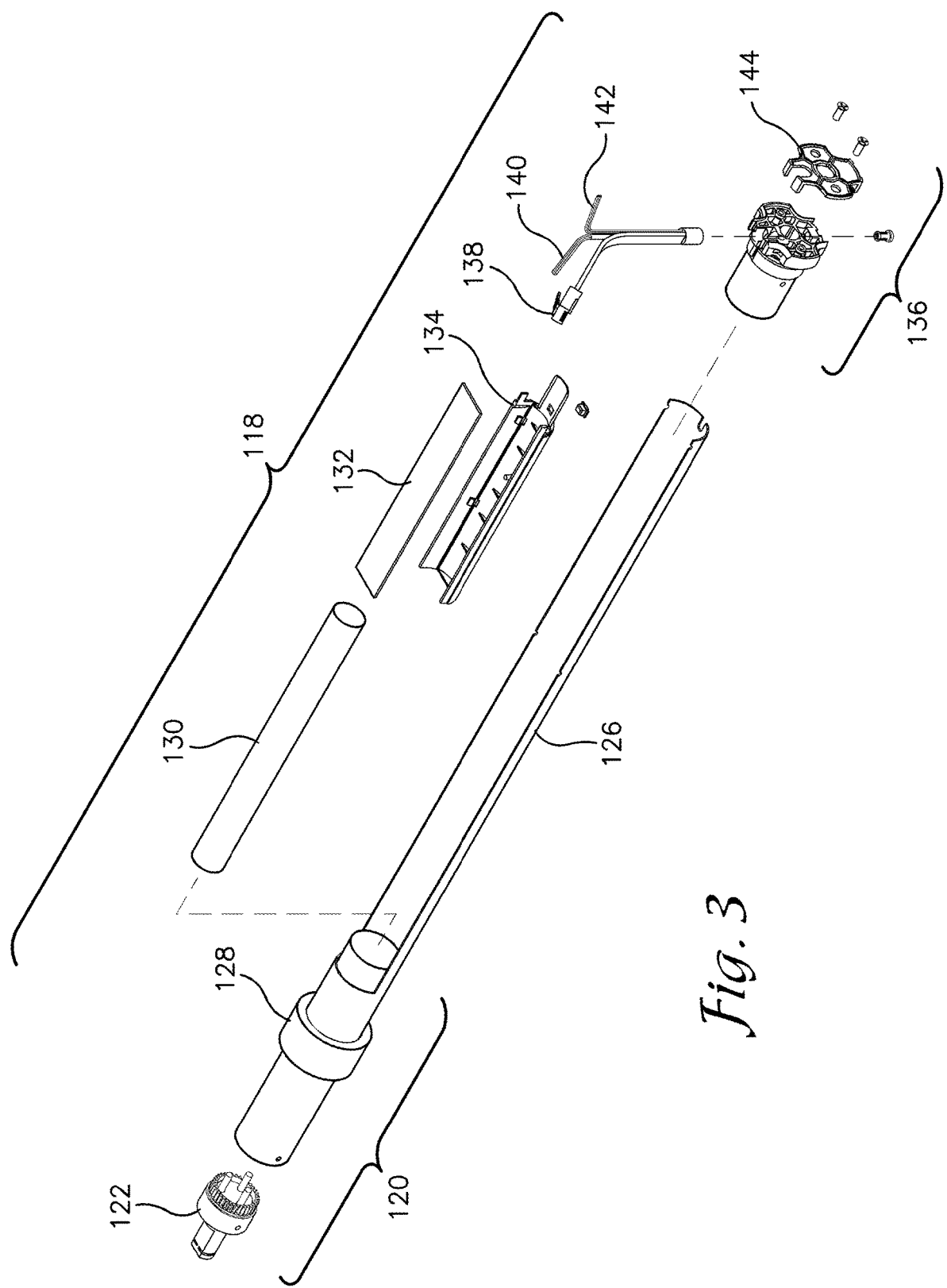
FIG. 3 is a close-up view of the internal motor, battery, circuit board, and hub of the motorized roller shade of FIG. 2.
Figure 10:
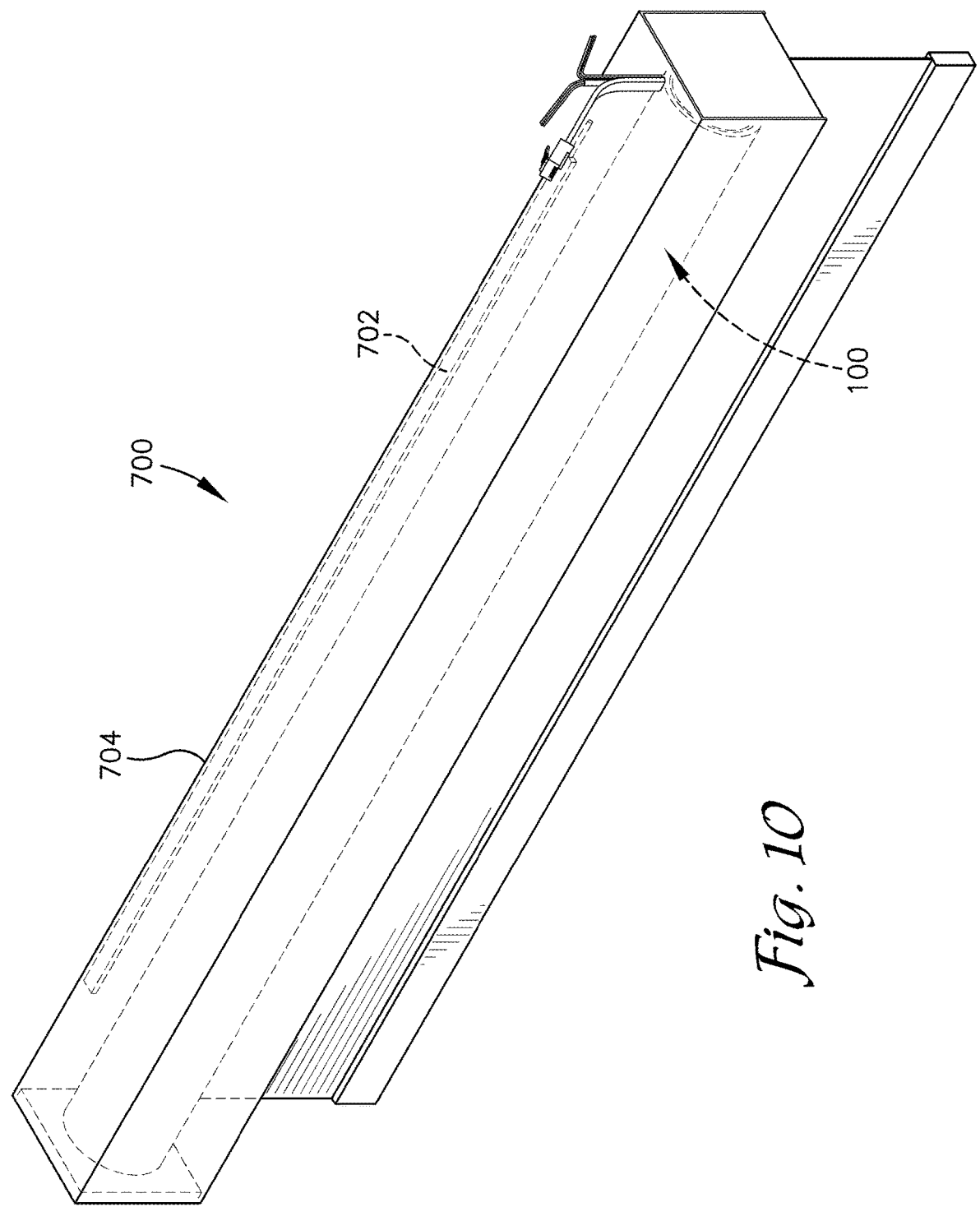
FIG. 10 is a perspective view of a motorized roller shade having an integrated LED lighting element in accordance with an exemplary embodiment of the present invention.
Figure 11:
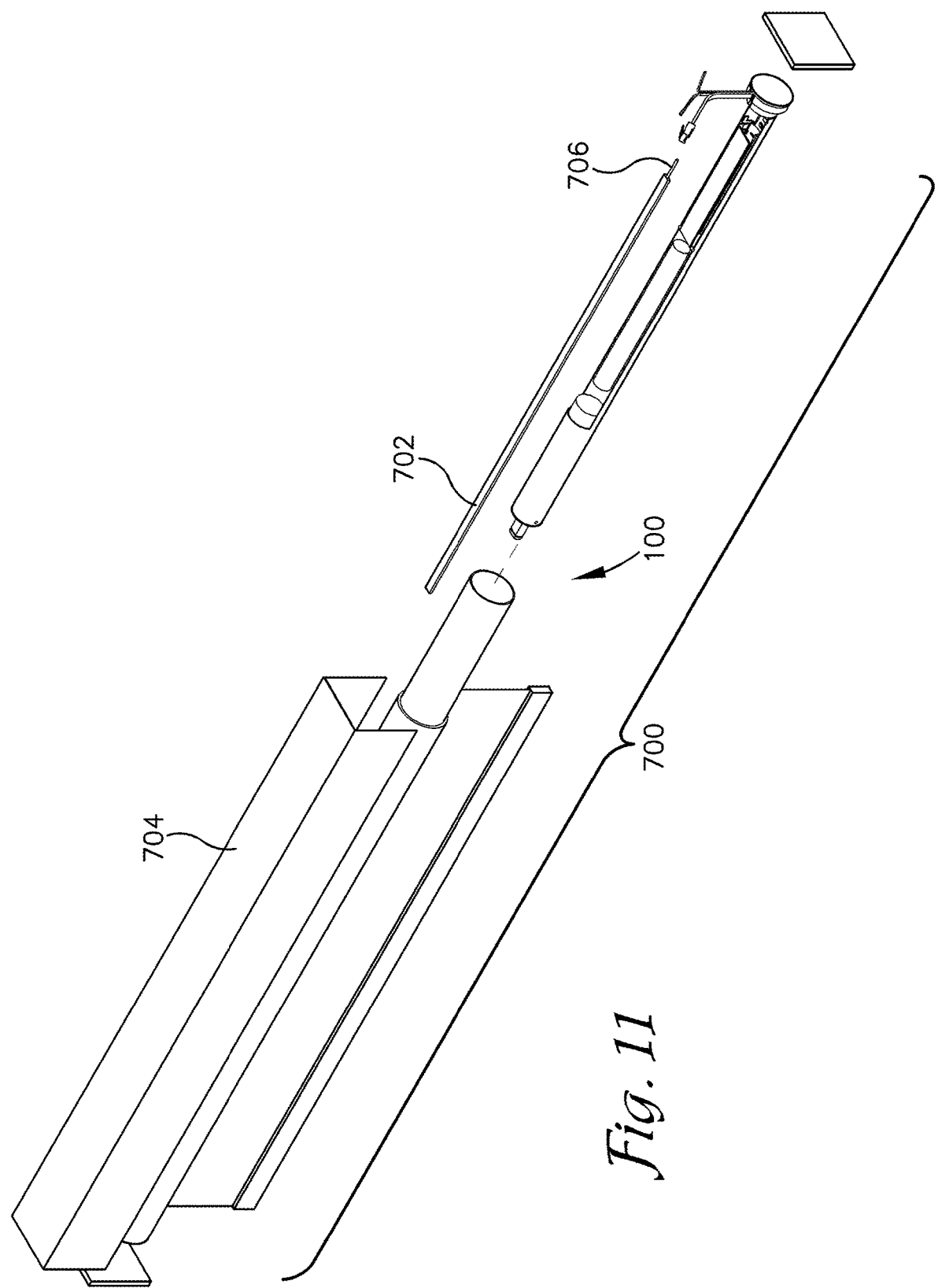
FIG. 11 is an exploded view of the motorized roller shade having an integrated LED lighting element of FIG. 10.

Looking to FIGS. 10 and 11, in another exemplary embodiment, a motorized shade as described with respect to FIG. 1, through 3 further includes a lighting element 702 attached within a rectangular housing 704 enclosing the roller shade 100. The lighting element 702 is positioned along an interior surface of the housing 704 such that, when illuminated, the emitted light downwashes across the surface of the shade material. It should be understood that the lighting element 702 may be installed to light either side of the shade, or that multiple lighting elements may be used to light both sides of the shade or to provide varying lighting capabilities.

The lighting element 702 is preferably an RGBW (red, green, blue, white) LED element capable of producing any desired color of light by lighting various combinations of the individual LEDs on the element either directly or through multiplexing circuitry. In an exemplary embodiment, the lighting element 702 is in communication with the logic and control circuitry of the shade via lighting conductors 706 routed from the control circuitry and through the hub in a manner similar to the serial conductors and dry contact conductors as described previously. In alternative embodiments, the lighting element communicates with the logic and control circuitry via the serial conductors.

In a manner similar to that previously described with respect to the operation of the shades, or groups of shades, the logic and control circuitry operates the lighting element 702 to provide lighting, with the logic and control circuitry of each individual shade autonomously controlling the local lighting element. In a preferred embodiment, the logic and control circuitry will automatically lower a shade when a command to light a shade is received and executed to ensure that the shade is in place to serve as a projection screen for the emitted light.

Thus, similar to the synchronized movement of the shades described above, lighting and lighting changes can by synchronized by using the start time command time signal to designate a future time for lighting elements to be illuminated or, for example, to transition from one color to another. Because the logic and control circuitry of each shade in a group of multiple shades will start the command at the same time, the lighting command and transitions will be synchronized.

In further embodiments, the lighting element 702 may be used for emergency backup lighting powered by the internal lithium ion battery in the motorized roller shad 100 upon detection of a power failure by the logic and control circuitry. In other embodiments, the lighting element 702 may be operated in conjunction with sensors or switches in communication with the logic and control circuitry to alert of detected conditions, such as indication of an alarm (e.g., glass breakage detection as previously discussed)

Preferably, the logic and control circuitry and/or the server include capability for implementing known lighting protocols, such as DALI, DMX, KNX, TCP/IP, Bluetooth, Wi-Fi, ZigBee, 6LoWPAN, Li-Fi, Analog, Power line Communication, EnOcea, and other protocols known in the art.

Because the lighting element integrates into an existing motorized roller shade and utilizes that shade's logic and control circuitry, and utilizes the same server and POE infrastructure, the cost and complexity of the lighting system is significantly reduced compared to add-on, separate lighting systems.

From the above, it can be seen that the motorized roller shade of the present invention can be employed to ensure power over Ethernet or self-powered operation via the lithium ion battery, and provide synchronized constant velocity operation through autonomous operation without communication of positional information to other shades or to a central server. In further embodiments, the motorized roller shade includes a lighting element that can be operated in synchronized manner similar to that of the roller shade.

While the motorized roller shade of the present invention have been described herein with respect to specific embodiments, many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A motorized roller shade, comprising:
a motor operable to rotate a roller tube onto which shade material is rolled or unrolled to respectively raise and lower the shade;
logic and control circuitry operable to actuate the motor and to communicate over a power over Ethernet network to receive commands indicative of a desired operation of the shade; and wherein the logic and control circuitry is further operable to actuate the motor autonomously without receiving a command or transmitting shade information to or from any other motorized shades or to a central server; and a rechargeable battery positioned within the roller tube and in electrical communication with the logic and control circuitry and the motor, the battery operable to power the motor and the logic and control circuitry, wherein the logic and control circuitry includes a non-volatile memory that stores shade and configuration parameters, including limits, memory positions, speed, schedules, target velocity, server hostname, network statistics, and other operational and physical parameters, and wherein the stored parameters allow the logic and control circuitry to autonomously operate the shade in synchronization with other motorized roller shades having the same configuration communication to a local or cloud server is interrupted.

2. The motorized roller shade of claim 1, wherein the logic and control circuitry charges the rechargeable battery using power derived from the power over Ethernet network.

3. The motorized roller shade of claim 1, wherein the non-volatile memory stores a plurality of parameters relating to physical, operational, and timing properties of the shade and components of the shade to initiate operation of the motor autonomously without receiving a command or transmitting shade information to or from any other motorized shades or to a central server.

4. The motorized roller shade of claim 3, wherein the logic and control circuitry regulates the velocity of movement of the shade based on the target velocity derived from a parameter stored in the non-volatile memory.

5. The motorized roller shade of claim 1, wherein the logic and control circuitry records an elapsed time for the shade to move a predetermined distance and compares the elapsed time to a target time to determine an adjustment to a motor control parameter to achieve a desired speed.

6. The motorized roller shade of claim 1, further comprising a lighting element in communication with the logic and control circuitry.

7. The motorized roller shade of claim 1, further comprising external interface conductors in communication with the logic and control circuitry, the interface conductors configured to connect to one or more sensors or switches.

8. A system for synchronously moving a plurality of motorized roller shades as set forth in claim 1, wherein each of the plurality of motorized roller shades is operable to:
receive a command over the power over Ethernet network, the command comprising a desired position of the shade and a desired start time;
compare the desired start time to a real-time clock signal of the logic and control circuitry;
begin movement of the shade when the real-time clock reaches the desired start time; and
move the shade to the desired position at a predetermined velocity.

9. The system of claim 8, wherein each of the plurality of motorized roller shades moves its respective shade to the desired position autonomously, without communicating shade positional information to any of the other of the plurality of motorized shades or to a central server.

10. The system of claim 8, wherein the predetermined velocity of each of the plurality of motorized roller shades is approximately equal to the predetermined velocity of each of the other of the plurality of motorized roller shades.

11. The system of claim 8, wherein the predetermined velocity of each of the plurality of motorized roller shades is preconfigured in non-volatile memory of the logic and control circuitry at the time of manufacture or is downloaded during installation or commissioning of the shade.

12. A method for synchronous movement of motorized roller shades, comprising:
providing a plurality of motorized roller shades as set forth in claim 1, wherein the logic and control circuitry of each of the plurality of motorized roller shades is operable to actuate the motor and to communicate over a network to receive commands indicative of a desired operation of the respective shade;
sending a command over the network to each of the plurality of shades, the command comprising a desired position of the shade and a desired start time;
comparing the desired start time to a real-time clock signal of the logic and control circuitry of each of the plurality of motorized roller shades;
each of the plurality of motorized roller shades moving to the desired position at a predetermined velocity upon the real-time clock signal matching the desired start time.

13. The method of claim 12, wherein each of the plurality of motorized roller shades moves its respective shade to the desired position autonomously, without communicating shade positional information to any of the other of the plurality of motorized shades or to a central server.

14. The method of claim 13, wherein the predetermined velocity of each of the plurality of motorized roller shades corresponds to the predetermined velocity of each of the other of the plurality of motorized roller shades.

15. The method of claim 14, wherein the predetermined velocity of each of the plurality of motorized roller shades is preconfigured in non-volatile memory of the logic and control circuitry at the time of manufacture or is downloaded during installation or commissioning of the shade.

* * * * *